United States Patent
Wuidart

(10) Patent No.: US 8,564,324 B2
(45) Date of Patent: Oct. 22, 2013

(54) MONITORING OF THE ACTIVITY OF AN ELECTRONIC CIRCUIT

(75) Inventor: Sylvie Wuidart, Pourreres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 433 days.

(21) Appl. No.: 12/853,606

(22) Filed: Aug. 10, 2010

(65) Prior Publication Data

US 2011/0128030 A1    Jun. 2, 2011

(30) Foreign Application Priority Data

Aug. 12, 2009 (FR) ..................................... 09 55634

(51) Int. Cl.
   *G01R 31/26* (2006.01)
(52) U.S. Cl.
   USPC ..................................................... 324/762.01
(58) Field of Classification Search
   None
   See application file for complete search history.

(56) References Cited

U.S. PATENT DOCUMENTS

| | | | |
|---|---|---|---|
| 2003/0219126 A1 | 11/2003 | Wuidart | |
| 2006/0092706 A1* | 5/2006 | Nakai et al. | 365/185.18 |
| 2006/0103436 A1* | 5/2006 | Saitou | 327/142 |
| 2008/0130348 A1* | 6/2008 | Bardouillet et al. | 365/148 |

OTHER PUBLICATIONS

French Search Report dated May 28, 2010 from corresponding French Application No. 09/55634.
Schroeder, Dieter K. et al., *Negative Bias Temperature Instability: Road to Cross in Deep Submicron Silicon Semiconductor Manufacturing*, Jul. 1, 2003, pp. 1-18, XP002584704.
Giancane L et al, *A New Dynamic Differential Logic Style as a Countermeasure to Power Analysis Attacks*, Electronics, Circuits and Systems, 2008. ICECS 2008. 15th IEEE International Conference on, IEEE, Piscataway, NJ, USA, Aug. 31, 2008, pp. 364-367, XP031362500.

* cited by examiner

*Primary Examiner* — Jermele M Hollington
(74) *Attorney, Agent, or Firm* — Wolf, Greenfield & Sacks, P.C.

(57) ABSTRACT

A method and a device for monitoring a digital signal, wherein a first P-channel MOS transistor is placed in degradation conditions of negative bias temperature instability type during periods when the signal to be monitored is in a first state; a first quantity representative of the saturation current of the first transistor is measured when the signal to be monitored switches to a second state; and a detection signal is switched when this first quantity exceeds a threshold.

25 Claims, 2 Drawing Sheets

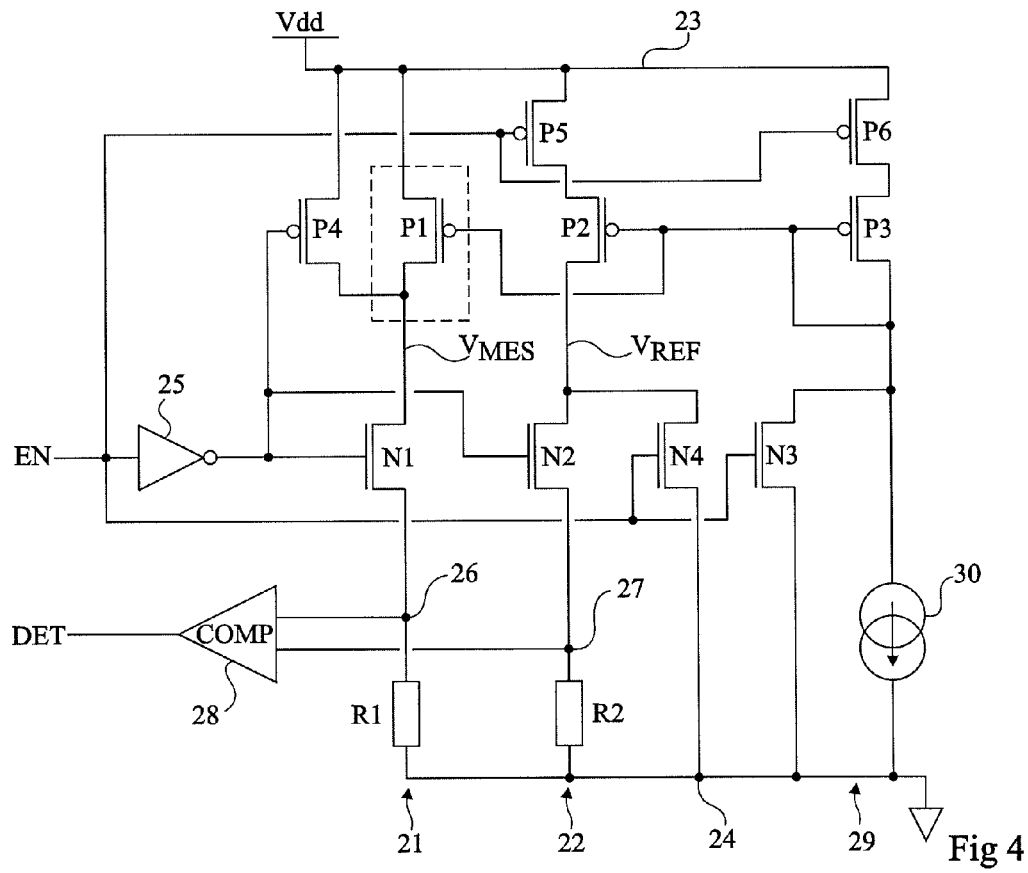
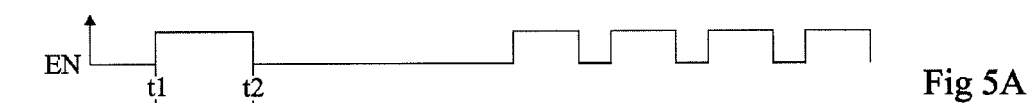
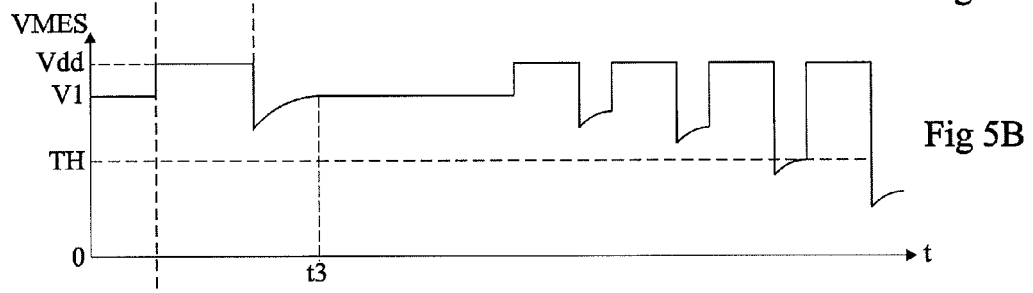
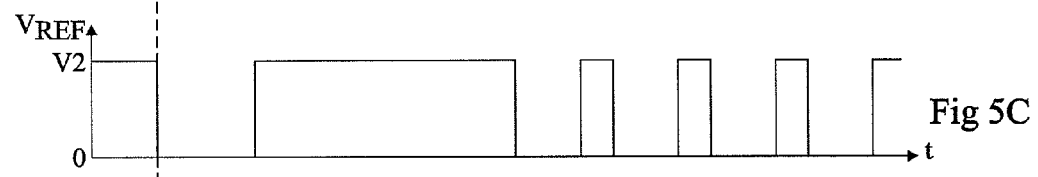
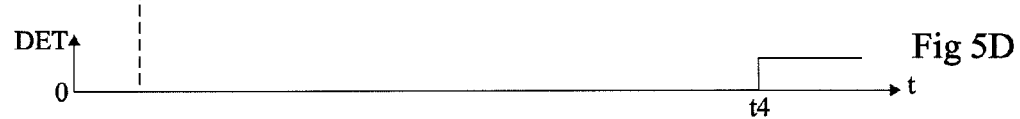

MONITORING OF THE ACTIVITY OF AN ELECTRONIC CIRCUIT

CROSS REFERENCE TO RELATED APPLICATIONS

This application claims the priority benefit of French patent application Ser. No. 09/55634, filed on Aug. 12, 2009, entitled "MONITORING OF THE ACTIVITY OF AN ELECTRONIC CIRCUIT," which is hereby incorporated by reference to the maximum extent allowable by law.

BACKGROUND OF THE INVENTION

1. Field of the Invention

The present invention generally relates to electronic circuits and, more specifically, to the monitoring of the activity of a circuit, of a component or of a function of an electronic circuit along time.

The present invention more specifically applies to the detection of a faulty operation of a circuit under the effect of a hacking attempt.

2. Discussion of the Related Art

In most circuits or components handling data considered as critical in terms of confidentiality, countermeasures against possible attempts to hack these data are desired to be provided.

A particularly common attack is the so-called side channel attack, where the consumption of the integrated circuit is analyzed (DPA—Differential Power Analysis) while said circuit performs operations manipulating secret data.

The detection of a side channel attack is generally performed by monitoring of the number of executions of the critical algorithm. Indeed, the attacker will make a great number of assumptions on data and/or keys and cause the execution of the algorithm a great number of times while analyzing the circuit power consumption.

A usual technique thus is to use a counter incremented or decremented on each new execution to detect when too high a number of operations is performed and then take the adequate measures. The counter of the number of operations is stored in a non-volatile memory area (EEPROM) of the integrated circuit. Indeed, the circuit is generally reset between successive attacks and the data should not be lost. There can be various types of countermeasures but the most frequent one is a disabling of the integrated circuit operation.

A disadvantage of this technique is that it does not take into account the time factor, which is important in case of an attack. Indeed, a large number of executions of the same algorithm gives an indication that an attack may be going on, but its repetition at high frequency is a more definite sign of attack.

SUMMARY OF THE INVENTION

It would be desirable to have a solution for monitoring the execution of given functions or operations in an integrated circuit.

It would also be desirable to take the time factor into account and, in particular, to distinguish a repetition of operations within a short time interval, which means a hacking attempt on the circuit data, from the same number of operations, however sufficiently spaced in time to correspond to a normal use.

Thus, an object of an embodiment of the present invention is to overcome all or part of the disadvantages of known hacking attempt detection techniques.

Another object of an embodiment of the present invention is to provide a low-bulk solution, which is simple to implement.

Another object of an embodiment of the present invention is to provide a solution capable of being implemented for different functions or operations of a same circuit.

More generally, an embodiment of the present invention aims at monitoring the activity of a function or operation of an integrated circuit in terms of number of executions along time.

To achieve all or part of these objects as well as others, at least one embodiment of the present invention provides a method for monitoring a digital signal, wherein:

a first P-channel MOS transistor is placed in degradation conditions of negative bias temperature instability type during periods when the signal to be monitored is in a first state;

a first quantity representative of the saturation current of the first transistor is measured when the signal to be monitored switches to a second state; and a detection signal is switched when this first quantity exceeds a threshold.

According to an embodiment of the present invention, said first quantity is the voltage at an intermediary point of a first branch comprising, in series, at least the first transistor and a resistive element.

According to an embodiment of the present invention, said first quantity is compared with a second corresponding quantity, provided by a second transistor, said detection signal being switched when the difference between said quantities exceeds a threshold.

According to an embodiment of the present invention, the signal to be monitored is a signal indicative of the state of a cryptographic operation.

The present invention also provides a device for monitoring a digital signal, comprising:

between two terminals of application of a supply voltage:

a first branch comprising, in series, a first P-channel MOS transistor, a first switch, and a first resistive element;

a second branch comprising, in series, a second switch, a second P-channel MOS transistor, a third switch, and a second resistive element;

a third branch capable of biasing the P-channel transistors of the first and second branches;

a comparator of the respective voltages across the resistive elements of the first and second branches; and an element capable of short-circuiting the source and drain of the P-channel transistor of the first branch when the signal to be monitored is in a first state.

According to an embodiment of the present invention, said first and third switches are N-channel MOS transistors.

According to an embodiment of the present invention, the digital signal to be monitored is applied, via an inverter, to the respective gates of the N-channel transistors of the first and second branches and to the gate of a P-channel transistor forming said element.

According to an embodiment of the present invention, the third branch comprises, in series between said terminals of application of the supply voltage, a fourth switch, a P-channel MOS transistor, and a current source.

According to an embodiment of the present invention, said second and fourth switches are P-channel MOS transistors.

The present invention also provides an electronic circuit comprising:

at least one sub-assembly executing a cryptography function; and at least one device for monitoring a signal indicative of the state of said function.

The foregoing objects, features, and advantages of the present invention will be discussed in detail in the following non-limiting description of specific embodiments in connection with the accompanying drawings.

BRIEF DESCRIPTION OF THE DRAWINGS

FIG. 4 is a detailed embodiment of the monitoring circuit of FIG. 3; and

FIGS. 5A, 5B, 5C, and 5D are timing diagrams illustrating the operation of the circuit of FIG. 4.

DETAILED DESCRIPTION

Figure 1:
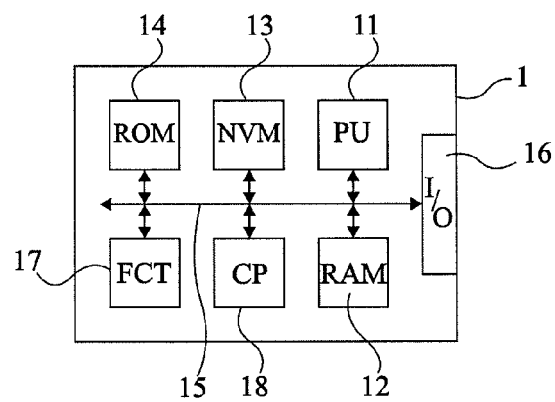
FIG. 1 is a block diagram of an electronic circuit of the type to which the present invention applies as an example.

The same elements have been designated with the same reference numerals in the different drawings.

For clarity, only those steps and elements which are useful to the understanding of the present invention have been shown and will be described.

In particular, the functions or operations monitored by the described embodiments have not been detailed, the present invention being compatible with any function or operation activated by a digital signal, capable of being executed by an integrated circuit and for which the variation of the execution frequency with respect to a threshold is desired to be monitored. Further, in the application to the monitoring of possible attacks, the countermeasures have not been detailed, the present invention being here again compatible with any usual countermeasure taken when an attack attempt has been detected.

FIG. 1 is a block diagram of an embodiment of an integrated circuit 1 of the type to which the present invention applies. Such a circuit generally comprises a processing unit 11 (PU), one or several memories 12, 13, and 14 among which, for example, a RAM or processing registers, one or several rewritable non-volatile memories (NVM), one or several non-rewritable non-volatiles memories (ROM). Circuit 1 comprises one or several control, address, and data buses 15 so that the different components communicate together, and an input/output interface 16 (I/O) for communicating with the outside of circuit 1. According to the application for which it is intended, circuit 1 comprises other components or circuits for implementing other functions (symbolized by a block 17, FCT). In the preferred application to secure components (for example, of smart card type), circuit 1 especially comprises a cryptoprocessor 18 (CP) in charge of performing functions implementing secret quantities (keys), for example, ciphering, deciphering, scrambling, signature calculation functions, etc. According to another example, the integrated circuit for which a monitoring of the activity is desired comprised a memory and a cryptoprocessor (with no central processing unit).

The present invention will be described hereafter in relation with an example of application to the monitoring of a cryptographic activity of the circuit to detect possible attacks. It, however, more generally applies to the monitoring of an activity of any component or circuit for which the frequency of occurrence of an operation is desired to be verified against a threshold. For example, the case in point may be to verify the frequency of deleting/programming operations in a non-volatile memory for, if need be, postponing some deleting/programming operations to decrease the stress upon the memory and improve its lifetime.

Figure 2A:
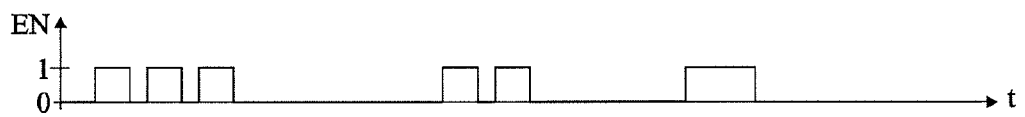
FIGS. 2A and 2B are timing diagrams illustrating examples of the shapes of signals of activation of a function of the circuit of FIG. 1, respectively in normal operation and in the presence of an attack.
Figure 2B:

FIGS. 2A and 2B are timing diagrams illustrating the activation periods (arbitrarily symbolized by a state 1) and the idle periods (arbitrarily symbolized by state 0) of a signal EN to be monitored. For example, signal EN is the enable signal of a cryptographic function. As a variation, it is a state signal indicating that such a function is active.

FIG. 2A illustrates a normal operation during which the operation is executed once or several times with relatively long idle periods. In practice, the idle periods are longer than the activity periods, the remaining time being used by the rest of the circuit to exploit the data provided by this function.

FIG. 2B illustrates the shape of signal EN in the presence of an abnormal operation (for example, in the presence of attacks). The repetition frequency of the cryptographic operations is much higher and, most of all, the operations are not separated by idle periods. This is due to the fact that a hacker has the cryptography operation executed with successive assumptions as to the data and/or the keys and that he resets the circuit without waiting for the data to have been processed any further. Indeed, the attack comprises monitoring the circuit power consumption during the execution of the cryptographic process to deduce information as to the keys. Immediately resetting the circuit to present it with other data or assumptions may also avoid that a countermeasure is triggered.

Figure 3:
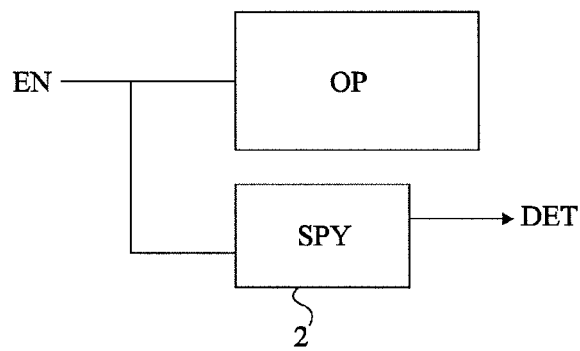
FIG. 3 is a block diagram of an embodiment of the present invention.

FIG. 3 is a block diagram of an embodiment of the present invention. An operation OP, for example, implemented by block 18 of FIG. 1, is assumed to be desired to be monitored. The operation to be monitored is assumed to receive an enable signal EN. This enable signal is sampled to be sent to a monitoring circuit 2 (SPY) providing a signal DET indicative of a possible abnormal operation. As a variation, state signal EN is sampled from inside of function OP. Circuit 2 analyzes the frequency of the activation periods of signal EN against a threshold to be able to detect an abnormal operation.

According to the described embodiments, advantage is taken of a parasitic effect of P-channel MOS transistors, that is, a negative bias temperature instability (NBTI). In specific bias conditions, charges are trapped in the transistor gate. This results in modifying the threshold voltage ($V_T$) of the transistor and, accordingly, its saturation current. This degradation is a function of time. The NBTI transistor degradation or stress occurs by a biasing of the transistor gate to a negative voltage while its drain, its source, and its bulk are grounded, or by application of a zero voltage on its gate while its drain, its source, and its bulk are at the positive supply voltage. This phenomenon usually occurs in transistor switching phases in a digital circuit, but it is only transient. The NBTI phenomenon is known and it is generally desired to be avoided in a usual operation of a transistor in CMOS technology.

This phenomenon is here used to cause a degradation of a detection transistor during periods when the function to be monitored is active. Advantage is then taken from the fact that the transistor returns to its normal (non-degraded) state after a time which depends, among others, on the extent of the degradation.

The NBTI phenomenon is known in the art. It is, for example, described in the paper "*Negative bias temperature instability: Road to cross in deep submicron silicon semiconductor manufacturing*" by Dieter K. Schroder and Jeff A. Babcock, published in the Journal of Applied Physics, vol. 94, pp. 1-18, July 2003 and in the paper "*A comprehensive model*

*of PMOS NBTI degradation*" by M. Alam and S. Mahapatra, published in Microelectronic Reliability, vol. 45, no 1, pp. 71-81, January 2005.

FIG. 4 is a detailed electric diagram of a detection circuit 2 such as illustrated in FIG. 3.

The principle is to compare the behavior of a P-channel MOS transistor P1 which will be submitted to an NBTI-type degradation during periods of activation of the function to be monitored, with respect to a transistor P2, also with a P channel but not submitted to a degradation during these periods. For this purpose, two branches 21 and 22, in parallel between two terminals 23 and 24 of application of a positive supply voltage Vdd, each comprise, in series, one of transistors P1 or P2, a switch (for example, an N-channel transistor) N1, respectively N2, and a resistive element R1, respectively R2. Branch 22 further comprises, between transistor P2 and terminal 23, a switch (for example, a P-channel MOS transistor P5) controlled by a signal EN for enabling the function to be monitored. The gates of transistors N1 and N2 receive the inverse (inverter 25) of signal EN for enabling the function. Interconnect node 26 between transistor N1 and resistor R1, and interconnect node 27 between transistor N2 and resistor R2, and thus the sources of transistors N1 and N2, are connected to the input of a comparator 28 (COMP) delivering the result of detection DET. Actually, comparator 28 indirectly compares data relative to the saturation current of transistors P1 and P2.

The biasing of transistors P1 and P2 is ensured by a third branch 29 comprising, in series between terminals 23 and 24, a switch (for example, a P-channel MOS transistor P6) controlled by a signal EN, a P-channel transistor P3, and a current source 30, transistor P3 being diode-assembled (gate and drain connected to each other) and its gate being connected to the respective gates of transistors P1 and P2.

Bias branch 29 is controllable by an N-channel MOS transistor N3 connecting the drain of transistor P3 (connected to current source 30) to ground 24. The gate of transistor N3 receives enable signal EN. Further, a transistor N4, having its gate also receiving signal EN, grounds the drain of transistor P2.

Measurement transistor P1 is placed in a degradation phase by means of a P-channel MOS transistor P4 short-circuiting its source and its drain when signal EN is in the high state. For this purpose, the gate of transistor P4 is connected to the output of inverter 25. The bulk of transistor P2, as well as that of all the P-channel transistors in the assembly is, by construction, connected to its source (and thus to voltage Vdd).

FIGS. 5A, 5B, 5C, and 5D are timing diagrams illustrating the operation of the circuit of FIG. 4. FIG. 5A illustrates an example of the shape of signal EN to be monitored. FIGS. 5B and 5C illustrate the respective shapes of voltages $V_{MES}$ and $V_{REF}$ of the respective drains of transistors P1 and P2. FIG. 5D illustrates the shape of signal DET provided by amplifier 28.

It is assumed that initially, measurement transistor P1 is not stressed. At a first activation of signal EN (time t1, FIG. 5A), transistors N3 and N4 are turned on. This results in pulling the gates of transistors P1 and P2, as well as the drain of transistor P2, to ground. Transistors P5 and P6 which receive signal EN on their respective gates are off. Voltage $V_{REF}$ is thus zero (neglecting the voltage drop in transistor N4 in the on state). Further, inverter 25 blocks transistors N1 and N2. Accordingly, both branches 21 and 22 are off. On the measurement transistor side, transistor P4 is turned on by inverter 25. Accordingly, the source, bulk, and drain of transistor P1 are at voltage Vdd (neglecting the voltage drop in transistor P4 in the on state), while its gate is grounded. Transistor P1 is then placed in NBTI degradation conditions and charges build up in its gate oxide.

At a time t2, when enable signal EN is deactivated, this stress disappears by turning-off of transistor P4. Simultaneously, transistors N1, N2 and P5, P6 are turned on and transistors N3 and N4 are turned off. A measurement phase then starts, both branches 21 and 22 being active. Comparator 28 compares the voltage levels at nodes 26 and 27 which, in this phase, correspond to the levels of voltages $V_{MES}$ and $V_{REF}$ (neglecting the voltage drop in transistors N1 and N2 in the on state). Bias branch 29 is activated by the turning off of transistor N3. Transistors P1 and P2 are thus turned on. As illustrated in the timing diagram of FIG. 5B, the charge build-up which has occurred while transistor P1 was off translates as a lower current in the transistor, which results in a voltage $V_{MES}$ smaller than a nominal level V1 (resistance R1 being fixed). On the side of the second branch, voltage $V_{REF}$ takes a value V2 conditioned by the value of resistance R2. Levels V1 and V2 are not necessarily identical. This depends on whether the switching threshold, that is, the level difference between voltages $V_{MES}$ and $V_{REF}$ (or conversely) of comparator 28 is set by an offset internal thereto or by the values of resistances R1 and R2. Since voltage $V_{REF}$ does not vary during measurement periods, the threshold corresponds to a value TH of voltage $V_{MES}$ below which transistor P1 is considered to have cumulated a sufficient degradation to consider an abnormal operation.

In the left-hand portion of the timing diagrams, the NBTI parasitic effect is assumed to disappear from a time t3, at which transistors P1 and P2 become identical again and voltage $V_{MES}$ takes value V1.

The right-hand portion of the timing diagrams illustrates an abnormal operation of the circuit, for example, a hacking attempt. In such a case, the activation periods of signal EN are very close to one another. As a result, transistor P1 does not have time to return to its nominal state. When (time t4) the charge build-up in the gate oxide of transistor P1 is such that voltage $V_{MES}$ falls below threshold TH, comparator 28 switches (signal DET, FIG. 5D).

The exploitation of signal DET may be a circuit blocking, the activation of a control, the fact of postponing another action (for example, in the case of a writing into non-volatile memories), etc.

An advantage of the described embodiments is that it is now possible to take into account the frequency of the circuit activation periods and no longer only their number.

Another advantage is that the degradation of transistor P1 is independent from any noise or disturbance of the power supply voltage (the two conduction terminals—drain and source—of transistor P1 are brought to the same voltage during degradation periods). Further, this degradation is insensitive to possible attacks of a different nature, for example, to laser attacks.

Another advantage is that it is no longer necessary to perform successive write operations into an EEPROM, which decrease the stress on this memory.

Another advantage is that the detection circuit takes little space. Several circuits 2 may thus be assigned, in a same electronic circuit, to the monitoring of different enable signals according to the application.

Various embodiments of the present invention have been described, and various alterations and modifications will occur to those skilled in the art. In particular, the practical implementation of embodiment of the present invention, in particular, the selection of the thresholds for triggering the detection signal, depends on the application and is within the abilities of those skilled in the art based on the functional indications given hereabove. Further, although embodiments of the present invention has been described in relation with an example intended for the monitoring of signals of activation of cryptographic functions, it more generally applies as soon as a frequency variation of the activation periods of a digital signal is desired to be monitored. Moreover, other measurement circuits may be envisaged. For example, for a given circuit, the reference used by comparator 28 may be provided by a resistive dividing bridge. An advantage of using a branch similar to the branch of transistor P1 however is to avoid possible dispersions.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for monitoring a digital signal, wherein:
   a first P-channel MOS transistor is placed in degradation conditions of negative bias temperature instability type during periods when the signal to be monitored is in a first state;
   a first quantity representative of the saturation current of the first transistor is measured when the signal to be monitored switches to a second state; and
   a detection signal is switched when this first quantity exceeds a threshold.

2. The method of claim 1, wherein said first quantity is the voltage at an intermediary point of a first branch comprising, in series, at least the first transistor and a resistive element.

3. The method of claim 1, wherein said first quantity is compared with a second corresponding quantity, provided by a second transistor, said detection signal being switched when the difference between said quantities exceeds a threshold.

4. The method of claim 1, wherein the signal to be monitored is a signal indicative of the state of a cryptographic operation.

5. A device for monitoring a digital signal, comprising:
   between two terminals of application of a supply voltage:
   a first branch comprising, in series, a first P-channel MOS transistor, a first switch, and a first resistive element;
   a second branch comprising, in series, a second switch, a second P-channel MOS transistor, a third switch, and a second resistive element;
   a third branch which biases the P-channel transistors of the first and second branches;
   a comparator of the respective voltages across the resistive elements of the first and second branches; and
   an element which short-circuits the source and drain of the P-channel transistor of the first branch so as to place the P-channel transistor of the first branch in degradation conditions of negative bias temperature instability when the signal to be monitored is in a first state.

6. The circuit of claim 5, wherein said first and third switches are N-channel MOS transistors.

7. The circuit of claim 6, wherein the digital signal to be monitored is applied, via an inverter, to the respective gates of the N-channel transistors of the first and second branches and to the gate of a P-channel transistor forming said element.

8. The circuit of claim 5, wherein the third branch comprises, in series between said terminals of application of the supply voltage, a fourth switch, a P-channel MOS transistor, and a current source.

9. The circuit of claim 8, wherein said second and fourth switches are P-channel MOS transistors.

10. A method for monitoring a digital signal, comprising:
    operating a first P-channel MOS transistor in a negative bias temperature instability degradation condition when the digital signal is in a first state; and
    providing a detection signal when the digital signal is in a second state and a quantity representative of a saturation current of the first P-channel MOS transistor exceeds a threshold.

11. A method for monitoring a digital signal as defined in claim 10, wherein operating the first P-channel MOS transistor in a negative bias temperature instability degradation condition includes connecting a source and a drain of the first P-channel MOS transistor to a voltage and biasing a gate of the first P-channel MOS transistor at a negative voltage relative to the source and drain.

12. A method for monitoring a digital signal as defined in claim 11, wherein providing a detection signal comprises measuring a first current in a first branch including at least the first P-channel MOS transistor and a first resistor, measuring a second current in a second branch including at least a second P-channel MOS transistor and a second resistor, and comparing the first and second currents to determine when the saturation current of the first P-channel MOS transistor exceeds the threshold.

13. A method for monitoring a digital signal as defined in claim 12, further comprising biasing the first and second P-channel MOS transistors using a third branch including at least a current source, a switch and a third P-channel MOS transistor coupled in series.

14. A method for monitoring a digital signal as defined in claim 12, wherein the first and second branches each include a switch, further comprising turning the switches off when the digital signal is in the first state.

15. A method for monitoring a digital signal as defined in claim 10, wherein the digital signal to be monitored is a signal indicative of the state of a cryptographic operation.

16. A circuit for monitoring a digital signal, comprising:
    a first P-channel MOS transistor;
    a switching element which operates the first P-channel MOS transistor in a negative bias temperature instability degradation condition when the digital signal is in a first state; and
    a comparator which provides a detection signal when the digital signal is in a second state and a quantity representative of a saturation current of the first P-channel MOS transistor exceeds a threshold.

17. A circuit for monitoring a digital signal as defined in claim 16, wherein the switching element is configured to connect a source and a drain of the first P-channel MOS transistor to a voltage when the digital signal is in the first state.

18. A circuit for monitoring a digital signal as defined in claim 17, comprising a first branch including at least the first P-channel MOS transistor and a first resistor, and a second branch including at least a second P-channel MOS transistor and a second resistor, wherein the comparator is configured to provide the detection signal by comparing a first current in the first branch and a second current in the second branch.

19. A circuit for monitoring a digital signal as defined in claim 18, further comprising a third branch configured to bias the first and second P-channel MOS transistors.

20. A circuit for monitoring a digital signal as defined in claim 18, wherein the first and second branches include first and second switches, respectively, wherein the first and second switches are turned off when the digital signal is in the first state.

21. A circuit for monitoring a digital signal, comprising:
a first branch including a first P-channel MOS transistor, a first switch and a first resistor coupled in series between a supply voltage and a reference voltage;
a second branch including a second P-channel MOS transistor, a second switch and a second resistor coupled in series between the supply voltage and the reference voltage;
a switching element which operates the first transistor in a negative bias temperature instability degradation condition when the digital signal is in a first state; and
a comparator which provides a detection signal when the digital signal is in a second state and a voltage across the first resistor exceeds a threshold.

22. A circuit for monitoring a digital signal as defined in claim 21, wherein the switching element is configured to connect a source and a drain of the first P-channel MOS transistor to a supply voltage when the digital signal is in the first state.

23. A circuit for monitoring a digital signal as defined in claim 22, wherein the comparator is configured to compare a voltage across the first resistor and a voltage across the second resistor.

24. A circuit for monitoring a digital signal as defined in claim 22, further comprising a third branch configured to bias the first and second P-channel MOS transistors.

25. A circuit for monitoring a digital signal as defined in claim 21, wherein the first and second switches are turned off when the digital signal is in the first state.

* * * * *